United States Patent
Yoo (12) 
(10) Patent No.: US 6,619,175 B2
(45) Date of Patent: Sep. 16, 2003

(54) V-CUTTER FOR AN LCD LIGHT GUIDE PANEL

(75) Inventor: Young Ho Yoo, Kyunggido (KR)

(73) Assignee: Fawoo Technology Co., LTD (KR)

( * ) Notice: Subject to any disclaimer, the term of this patent is extended or adjusted under 35 U.S.C. 154(b) by 112 days.

(21) Appl. No.: 09/766,914

(22) Filed: Jan. 22, 2001

(65) Prior Publication Data

US 2002/0059860 A1 May 23, 2002

(30) Foreign Application Priority Data

Nov. 21, 2000 (KR) ........................................ 2000-69322

(51) Int. Cl.[7] .............................. B26D 3/06; B26D 5/20; B26D 7/26
(52) U.S. Cl. .............................. 83/875; 83/879; 83/554; 83/558; 83/563; 83/631; 83/640; 125/23.01; 125/35; 33/32.4; 33/41.4; 33/44
(58) Field of Search .......................... 83/875, 917, 692, 83/693, 554, 555, 556, 558, 563, 618, 631, 640, 876, 879; 125/23.02, 35, 38, 23.01; 33/41.4, 44, 32.5, 32.6, 32.3, 32.4, 32.7, 32.1

(56) References Cited

U.S. PATENT DOCUMENTS

| | | | | |
|---|---|---|---|---|
| 1,778,155 A | * | 10/1930 | Hildreth ................... 83/917 X |
| 2,158,900 A | * | 5/1939 | Goffaux .................... 33/32.1 X |
| 2,601,725 A | * | 7/1952 | Henry et al. ................ 33/32.3 |
| 2,793,471 A | * | 5/1957 | Kurata et al. ............. 33/32.3 X |
| 3,164,906 A | * | 1/1965 | Andaloro ................... 33/41.4 |
| 3,680,213 A | * | 8/1972 | Reichert ................... 33/32.3 X |
| 4,328,553 A | * | 5/1982 | Fredriksen et al. ....... 125/35 X |
| 4,485,713 A | * | 12/1984 | Dotta ....................... 83/640 X |
| 4,519,139 A | * | 5/1985 | Ghinamo ................... 33/32.3 |
| 4,738,573 A | * | 4/1988 | Johnson, Jr. .............. 83/875 X |
| 4,951,375 A | * | 8/1990 | Erlenmaier ............... 83/563 X |
| 5,078,559 A | | 1/1992 | Abe et al. .................. 409/304 |
| 5,080,540 A | | 1/1992 | Abe et al. .................. 409/304 |
| 5,193,426 A | * | 3/1993 | Dunn ....................... 83/618 X |
| 5,330,409 A | * | 7/1994 | Futamura et al. ......... 83/563 X |
| 5,399,049 A | | 3/1995 | Abe et al. .................. 409/132 |
| 5,494,385 A | | 2/1996 | Abe et al. .................. 409/304 |
| 5,575,598 A | | 11/1996 | Abe et al. .................. 409/304 |
| 5,778,749 A | * | 7/1998 | Dunn ....................... 83/563 X |
| 5,803,797 A | * | 9/1998 | Piper ................... 125/23.01 X |
| 5,838,400 A | * | 11/1998 | Ueda et al. ................. 349/58 |
| 5,966,112 A | * | 10/1999 | Katagiri et al. ............. 345/104 |
| 6,134,092 A | * | 10/2000 | Pelka et al. ................. 361/31 |
| 6,239,851 B1 | * | 5/2001 | Hatazawa et al. ............ 349/62 |
| 6,398,610 B1 | * | 6/2002 | Inoue ........................ 445/66 |
| 6,467,383 B1 | * | 10/2002 | Charbonnier ............ 83/631 X |
| 6,494,197 B1 | * | 12/2002 | Yoshimura et al. .. 125/23.01 X |

* cited by examiner

*Primary Examiner*—Charles Goodman
(74) *Attorney, Agent, or Firm*—Madson & Metcalf (57) ABSTRACT

A V-cutter for use in forming V-shaped grooves (3) on a light guide panel (1) of the backlight unit for a liquid crystal display (LCD) is disclosed. The V-cutter may include a Z-axis lift piece (7) and a W-axis lift piece (8), each of which has a pin kit (10a, 10b) with a plurality of pins (9a, 9b) attached at the bottom thereof. The pins (9a, 9b) are preferably equal in number and spacing to the V-shaped grooves (3) to be formed. The lift pieces (7, 8) may be vertically actuated by a Z-axis controller (5) and a W-axis controller (6). The light guide panel (1) is preferably fixtured to a table (11). The lift pieces (7, 8) are configured to move with respect to the table (11) so that, through successive X-axis and Y-axis operations, the V-shaped grooves can be formed in perpendicular directions with only two reciprocating motions. As a result, the manufacturing cost of the light guide panels (1) is reduced.

3 Claims, 9 Drawing Sheets

FIG.1

PRIOR ART

FIG.2

PRIOR ART

FIG.3

PRIOR ART

V-CUTTER FOR AN LCD LIGHT GUIDE PANEL

BACKGROUND OF THE INVENTION

1. Technical Field

The present invention relates to a V-cutter used to manufacture light guide panels for backlight units for liquid crystal displays (LCD), and more particularly, to a V-cutter designed to form a plurality of V-shaped grooves in the light guide panel at a specified interval with two reciprocating motions.

2. Background Art

An LCD (liquid crystal display) unit, such as may be used in a flat panel computer screen, is not self-illuminating, and therefore requires a separate backlight unit with a light source behind the LCD unit.

Because a large investment in the LCD industry has been made in Japan, Korea and Taiwan, demand for the LCD unit, backlight unit, and other related parts is increasing accordingly.

Recently, LCD units have become smaller and lighter. Accordingly, backlight units for the new LCD units have become thinner and lighter through the use of a side light configuration.

In a backlight unit with a side light configuration, the emitted light by a light source to the side of the light guide panel is dispersed to have a uniform luminance across the light guide panel, so that a regular pattern is formed on the bottom of the light guide panel.

Since the light source for emitting the light is disposed on the side of the light guide panel, the pattern with a wider interval is disposed at the area adjacent to the light source and the pattern with a narrower interval is disposed at the area far from the light source, in order to keep the luminance uniform across the surface of the light guide panel.

The pattern on the bottom of the light guide panel used to disperse the light from the side-mounted light source may be, for example, a known groove pattern type for TFT-LCD monitor or a print pattern type for a notebook computer screen.

Figure 1:
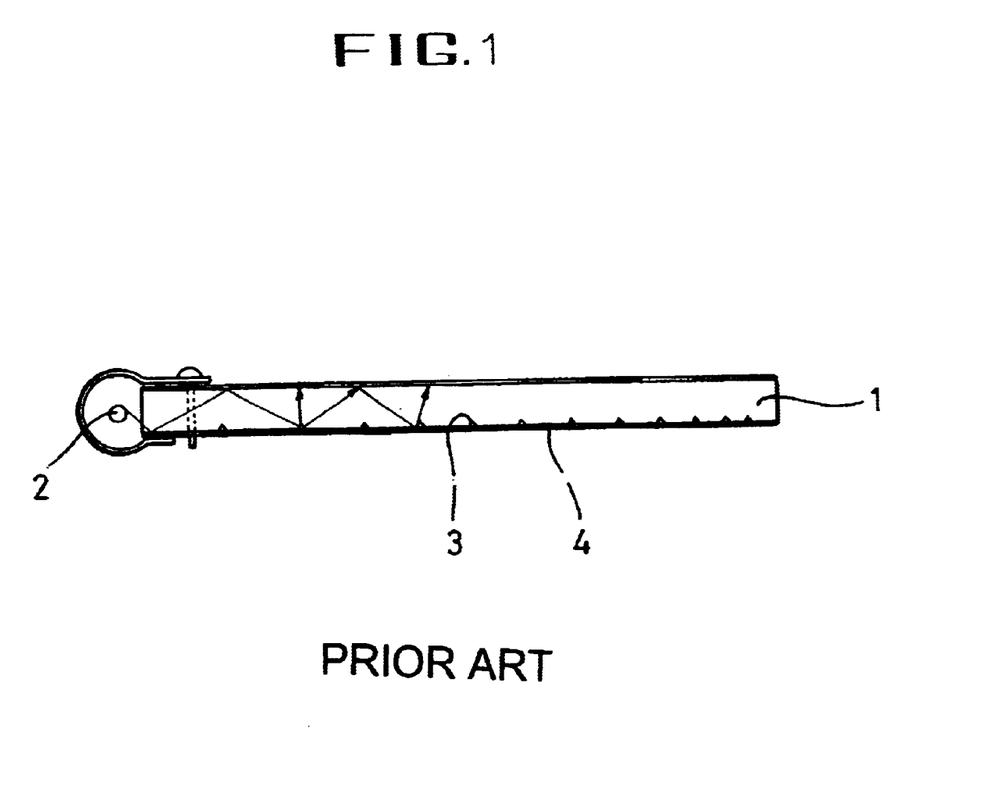
FIG. 1 is a longitudinal sectional view of a backlight unit with V-shaped grooves formed in the light guide panel according to a pattern.

FIG. 1 is a longitudinal sectional view of one example of a backlight unit with light guide panels disposed in a groove pattern in which the upper portion is a plane of the light guide panel on which the liquid display elements are disposed, and the lower portion is a bottom of the light guide panel.

On a side of the light guide panel 1 having a transmission material, a light source 2 for illuminating the LCD unit is disposed. The light source may take the form of a cool cathode fluorescent lamp (CCFL). At the bottom of the light guide panel a plurality of V-shaped grooves 3, or grooves 3, are formed. The V-shaped grooves 3 serve to uniformly disperse the light emitted by the light source 2. A reflecting seat 4 constructed of a reflective material, such as PET, is attached thereon.

The grooves 3 formed on the bottom on the light guide panel 1 disperse the emitted light from the light source 2 across the upper surface of the light guide panel. The grooves 3 are separated by a wider interval in vicinity of the light source 2 because the light against the nearer grooves 3 has a comparatively high luminance. The grooves 3 further from the light source 2 are spaced apart by a narrower interval so that the luminance can be uniformly maintained on the plane of the light guide panel 1.

In the backlight unit, light from the light source does not simply travel straight, but is refracted at a predetermined angle, as depicted by the arrows in FIG. 1, to disperse on the inner surface of the light guide panel. The refracted light then provides backlighting for the LCD unit disposed on the upper surface of the light guide panel.

The light emitted by the light source 2 is uniformly refracted by V-shaped grooves 3 formed on the plane of the light guide panel 1 by a device called a "V-cutter".

Conventionally, a V-cutter has a lift piece disposed on slider that moves horizontally (along the X-axis) along a guide rail. A controller such as a hydraulic or mechanical cylinder or a step motor may vertically actuate the lift piece. A pin for forming the V-shaped grooves 3 on the light guide panel may be affixed to the bottom surface of the lift piece. The light guide panel is typically fixtured on a table configured to move a single step (one pitch) perpendicular to the direction of motion of the slider after the formation of each groove, so that the next groove can be made at the proper location.

In operation, the slider moves along the guide rail (in the direction of the X-axis) and the lift piece is lowered (in the direction of the Z-axis) to the bottom dead center position by the controller. The slider and lift piece then return to their initial positions to complete formation of one V-shaped groove in the light guide panel.

After formation of the first of the V-shaped grooves 3, the table moves indexes the light guide panel to a different position with respect to the lift piece to form another of the grooves 3 at a pitch, or displacement from the first groove. This process repeats until all of the V-shaped grooves 3 have been formed with the proper pitch.

The conventional method is disadvantageous because the grooves 3 must be formed one-by-one on the light guide panel. Considerable machine and operator time is required. As a result, the lead time and manufacturing cost of the backlight manufacturing process is somewhat high.

Additionally, with the reciprocal movement of the slider along the guide rail, the table must be indexed by 1 pitch to form the parallel V-shaped grooves 3 on the light guide panel. This indexing typically requires that the table be moved in a direction 90 degrees from the horizontal motion of the slider. This indexing requires additional time for the formation of each groove. As a result, still more time is required to complete formation of the V-shaped grooves 3 on the light guide panel.

Furthermore, the conventional technique utilizes only a single pin to manufacture all of the V-shaped grooves 3. With such heavy use, it is inevitable for the pin to wear out after a comparatively short lifetime. Thus, frequent maintenance of the V-cutter is required, and more light guide panels may need to be scrapped or reworked due to processing with worn-out pins.

SUMMARY OF THE INVENTION

The present invention provides a system and method for solving the problems presented by known V-cutters. One object of the invention is to simultaneously form V-shaped grooves through the use of a plurality of pins corresponding to the grooves on the light guide panel in a simple, two-time operation.

In order to achieve the objects of the invention, an enhanced V-cutter is provided for manufacturing light guide panels for LCD units. According to one aspect of the present invention, the V-cutter may have a two pin kits, each of which has a plurality of pins separated by the proper spacing to form V-shaped grooves with a predetermined interval on the light guide panel. The light guide panel may be fixtured on a table configured to move in a Y-axis direction. One of the pin kits may be affixed to a Z-axis lift piece, while the other is affixed to a W-axis lift piece. A Z-axis controller and a W-axis controller may vertically actuate the lift pieces. The Z-axis lift piece and the W-axis lift piece may be disposed on an X-axis slider configured to move in an X-axis direction. Thus, the table and X-axis slider can be successively actuated only one time each to form perpendicular V-shaped grooves on the light guide panel.

According to another aspect of the present invention, the Z-axis lift piece may be affixed to a body or a fixed frame of the V-cutter instead of the X-axis slider.

According to further aspect of the present invention, the table may be attached to an X-axis slider, and the Z-axis and W-axis lift pieces may both be stationary. The table may then move in both X-axis and Y-axis directions so that the pins can form the perpendicular V-shaped grooves.

According to yet another aspect of the present invention, the table may be stationary, and an X-axis slider may be affixed to a moving frame configured to move in the Y-direction. The W-axis lift piece and the Z-axis lift piece may both be attached to the X-axis slider, so that the perpendicular V-shaped grooves can be formed through motion of the X-axis slider and the moving frame.

In order to manufacture larger light guide panels, dual W-axis or Z-axis lift pieces may be provided and arranged side-by-side. Each lift piece may have a pin kit with a plurality of pins. In order to fabricate a wide row of V-shaped grooves, one lift piece may be lowered to create a series of V-shaped grooves, and then the other lift piece may be indexed into position to continue the row of V-shaped grooves without any abnormal spacing between the V-shaped grooves created by the two lift pieces. Dual lift pieces could be used for the Z-axis or W-axis lift pieces, and may be incorporated into any of the V-cutter configurations described above.

These and other objects, features, and advantages of the present invention will become more fully apparent from the following description and appended claims, or may be learned by the practice of the invention as set forth hereinafter.

BRIEF DESCRIPTION OF THE DRAWINGS

The present invention will be described in detail through use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 4 through 10, is not intended to limit the scope of the invention, as claimed, but is merely representative of presently preferred embodiments of the invention.

FIGS. 4 to 10 show exemplary first, second, third, and fourth embodiments of the present invention in which a Z-axis lift piece 7 and a W-axis lift piece 8 are disposed to lift vertically in accordance with a Z-axis controller 5 and a W-axis controller 6 configured to move in the Z-axis direction and the W-axis direction, respectively. Two pin kits 10a and 10b may be disposed at the bottom of the lift pieces 7, 8. Each of the pin kits 10a, 10b may have a plurality of pins 9a and 9b that correspond in number and pitch to the V-shaped grooves 3 on the light guide panel 1.

Figure 2:
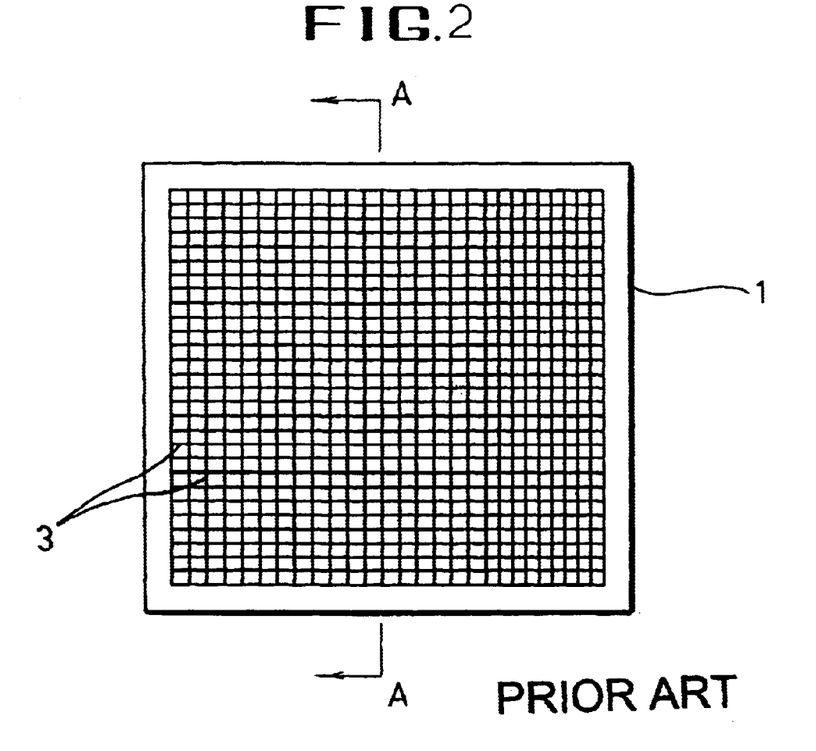
FIG. 2 is a plane view of a typical light guide panel.
Figure 3:
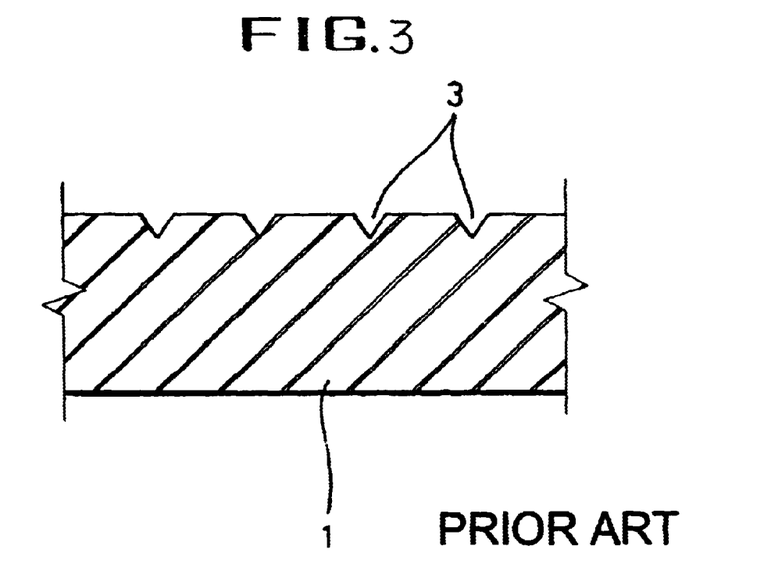
FIG. 3 is an enlarged section view, taken across the section designated A—A in FIG. 2.

The light guide panel 1 may be fixtured to a table 11 that moves horizontally in a Y-axis. An X-axis slider 12 may be disposed perpendicular to the table 11 and configured to move one of the lift pieces 7, 8 in an X-axis direction so that the X-axis slider 12 and the table 11 can cooperate to form the V-shaped grooves 3 crossing at right angles, as depicted in FIG. 2. The X-axis slider 12 may be actuated before or after the table 11 moves in the Y-axis direction.

Figure 4:
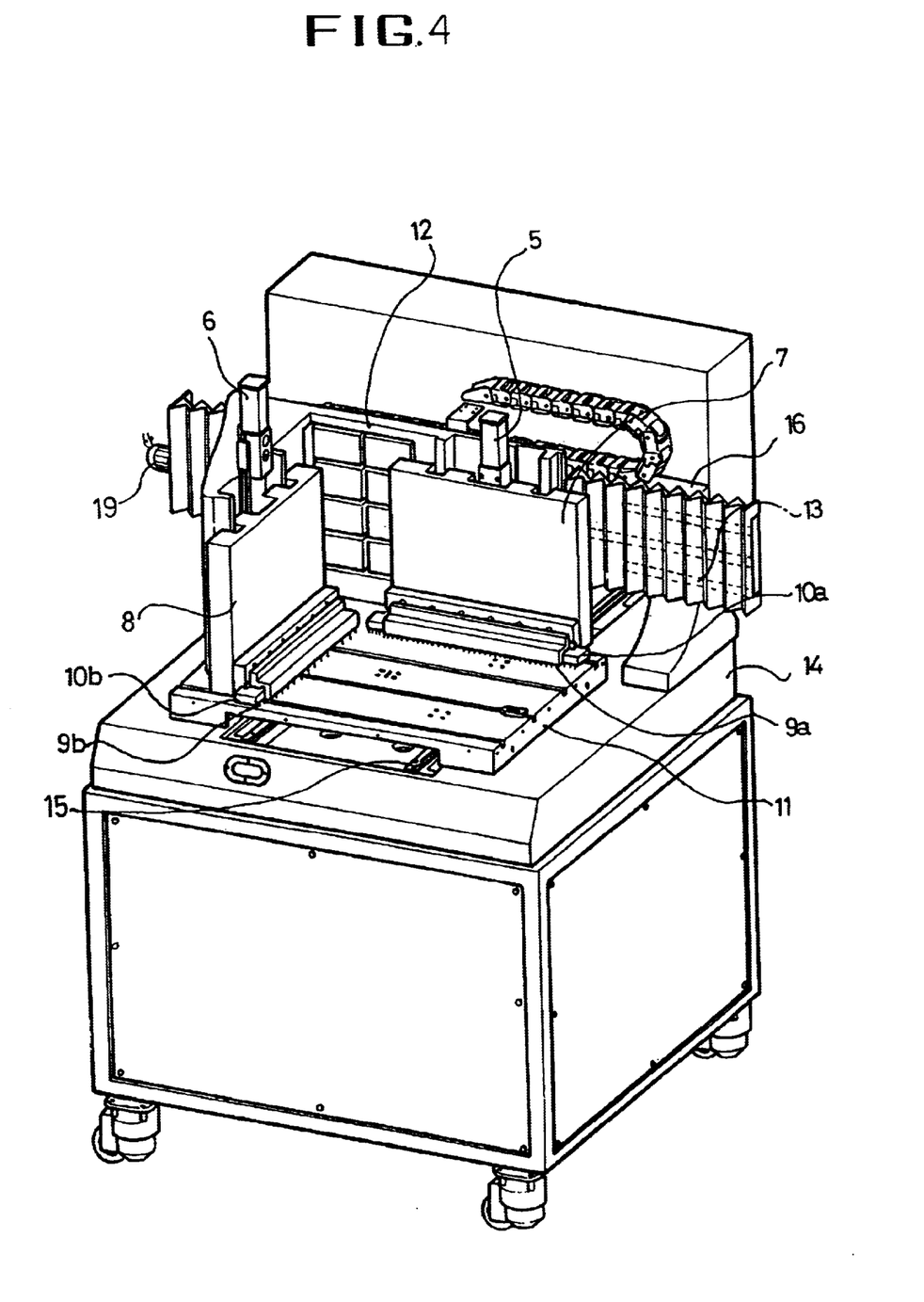
FIG. 4 is a perspective view of a first embodiment of a V-cutter according to the present invention.
Figure 5:
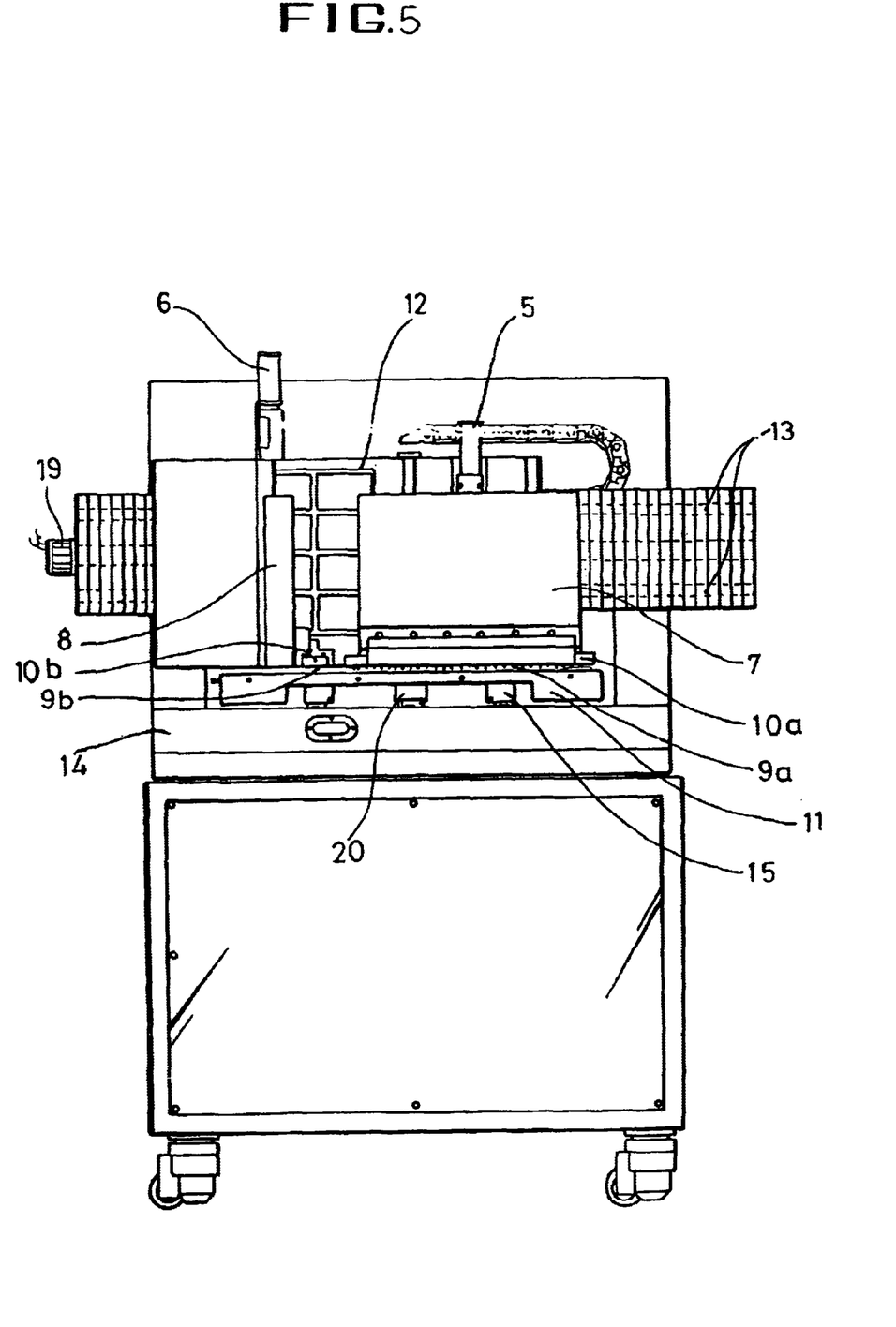
FIG. 5 is a front view the V-cutter of FIG. 4.

FIGS. 4 and 5 are a perspective view and a front view, respectively, of a first embodiment of the invention. In this embodiment, the W-axis lift piece 8 may be oriented substantially perpendicular to the X-axis slider 12 and attached to the X-axis slider 12. The W-axis lift piece 8 can then move horizontally, through operation of the X-axis slider 12, or vertically, through operation of the W-axis controller 6. The X-axis slider 12 may move along a guide rail 13. A Z-axis controller 5 may then vertically actuate the Z-axis lift piece 7, which may also be attached to the X-axis slider 12, if desired.

Pin kits 10a and 10b may be affixed to the bottom of the Z-axis and W-axis lift pieces 7 and 8, respectively. The pin kits 10a and 10b each have a plurality of pins 9a and 9b that correspond in number and pitch to the V-shaped grooves 3 on the light guide panel 1. The table 11 is slidably attached to a body 14 of the V-cutter. The light guide panel 1 is preferably fixtured to the table 11 so that the light guide panel 1 moves with the table 11 in the Y-axis direction, perpendicular to the X-axis direction.

A Y-axis driver 20 may be included to actuate the table 11 along a rail 15.

The V-shaped grooves 3 may be formed by, first, using the Z-axis controller 5 to lower the Z-axis lift piece 7 to a bottom dead center position. The Y-axis driver 20 may then be used to move the table 11 in the Y-axis direction. The downward-pointing pins 9a of the pin kit 10a affixed to the Z-axis lift piece 7 move across the light guide panel 1 so that each of the pins 9a forms one of the V-shaped grooves 3 oriented in the Y-axis direction. Each of the V-shaped grooves 3 is offset from its nearest neighbors by the proper pitch.

During formation of the V-shaped grooves 3 in the Y-axis direction, the W-axis controller 6 is inactive so that the W-axis lift piece 8 remains in the top dead center position.

After a plurality of V-shaped grooves 3 are formed in Y-axis direction on the light guide panel 1, the Z-axis controller 5 and the Y-axis driver 20 operate in reverse to return the Z-axis lift piece 7 and the table 11 to their initial positions. Then, the W-axis controller 6 may activate to lower the W-axis lift piece 8 to the bottom dead center position while the X-axis slider 12 is driven along the guide rail 13 in the X-axis direction. Thus, a plurality of V-shaped grooves 3 is formed in the X-axis direction on the light guide panel 1.

Consequently, the V-shaped grooves 3 in the X-axis direction and in the Y-axis direction are formed on the light guide panel 1 through one reciprocation of the table 11 and one reciprocation of the X-axis slider 12.

The method described above includes moving the table 11 first to form the V-shaped grooves 3 in the Y-axis direction, and then moving the X-axis slider 12 to form the V-shaped grooves 3 in the X-axis direction. However, the order of formation of the V-shaped grooves 3 may be reversed. For example, the X-axis slider 12 may first be moved in the X-axis direction to form V-shaped grooves 3 in the X-axis direction, and then the table 11 may be actuated to form the V-shaped grooves 3 in the Y-axis direction. Thus, the operational sequence of the X-axis slider 12 and the table 11 is not limited by the invention.

Figure 6:
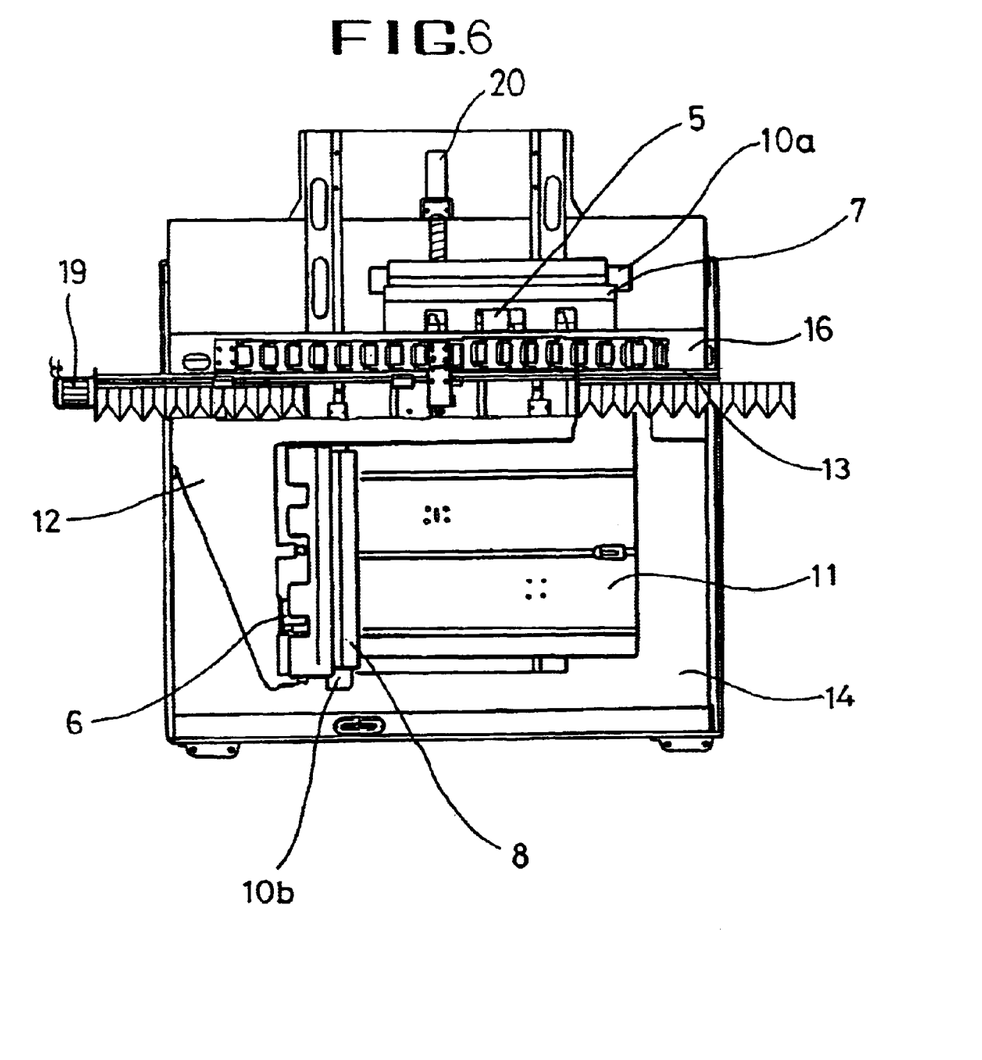
FIG. 6 is a top view of a second embodiment of a V-cutter according to the present invention.

FIG. 6 shows a second possible embodiment of the invention. The embodiment of FIG. 6 differs from that of FIGS. 4 and 5 in that the Z-axis lift piece 7 and Z-axis controller 5 are not attached to the X-axis slider 12, but are affixed to a fixed frame 16 that does not move horizontally or vertically. The fixed frame 16 may also support the X-axis slider 12.

Figure 7:
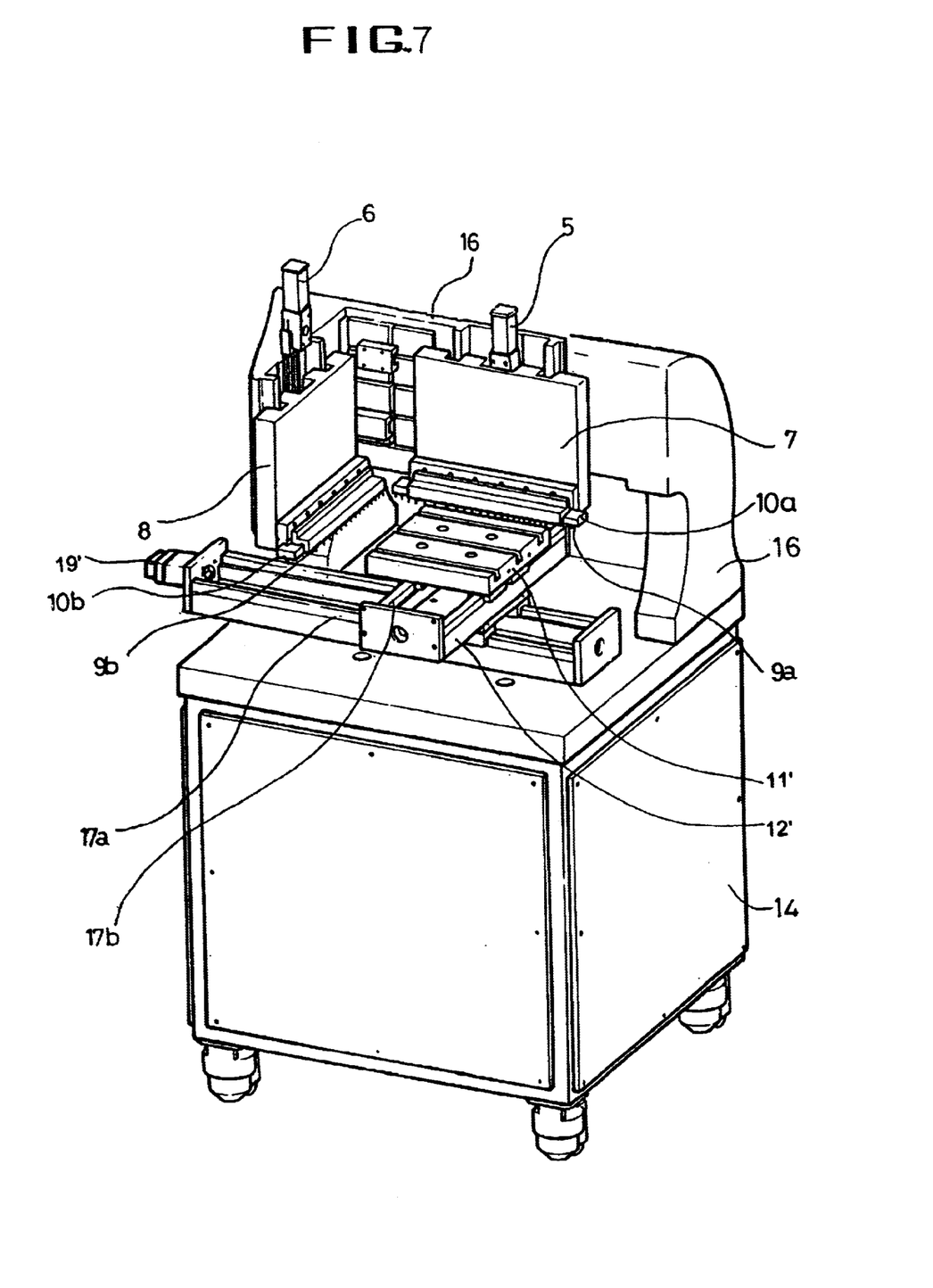
FIG. 7 is a perspective view of a third embodiment of a V-cutter of the present invention.
Figure 8:
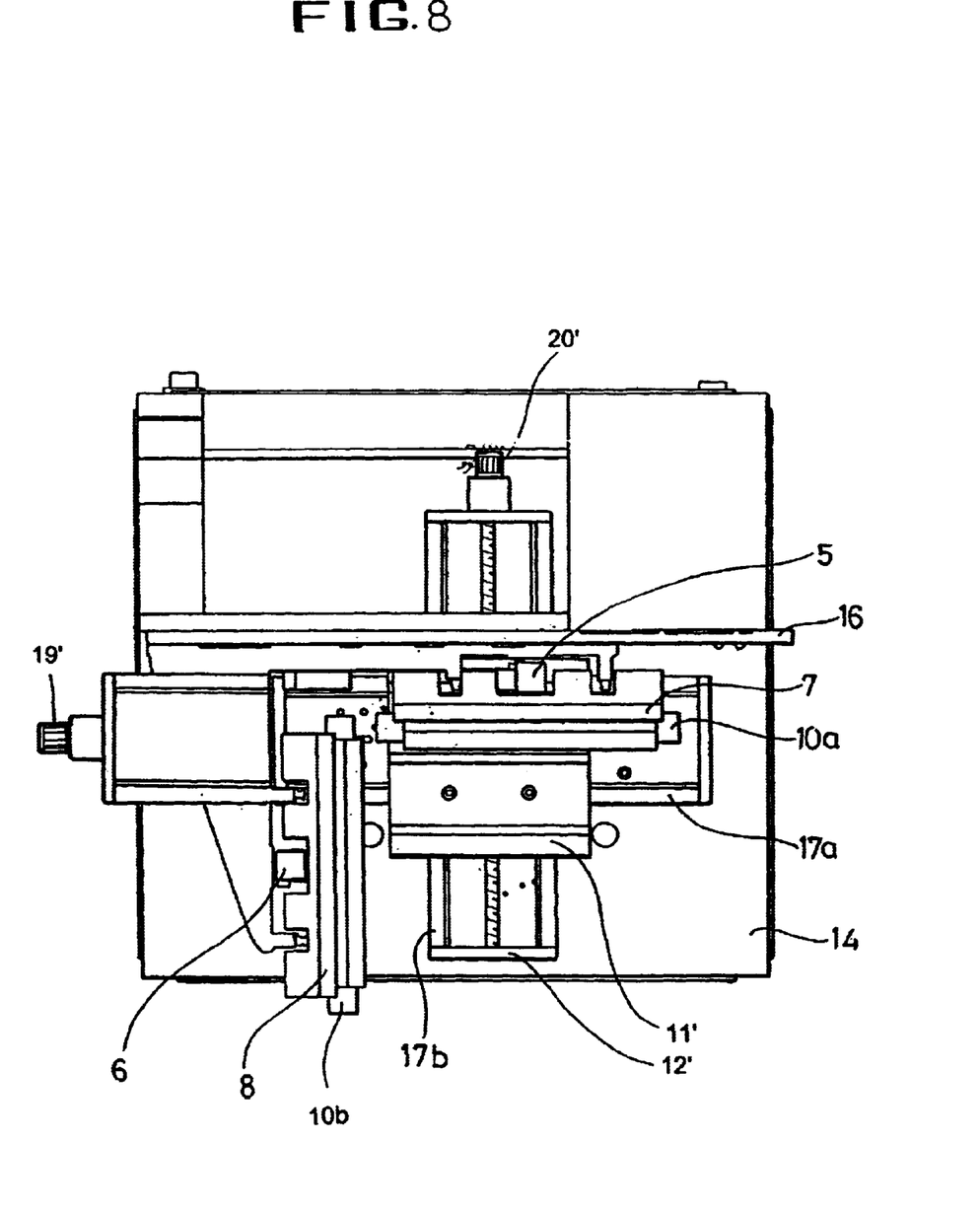
FIG. 8 is a top view of the V-cutter of FIG. 7.

FIGS. 7 and 8 show a third exemplary embodiment of the invention. The fixed frame 16 may protrude upward from the body 14 in near-vertical fashion. The Z-axis controller 5 may be attached to an exposed vertical face of the fixed frame 16 and slidably connected to the Z-axis lift piece 7. The W-axis lift piece 8 may also be attached to the fixed frame 16 and positioned perpendicular to the face of the fixed frame 16 on which the Z-axis lift piece 7 travels. Once again, the W-axis controller 6 vertically actuates the W-axis lift piece 8.

As with previous embodiments, pin kits 10a and 10b may be affixed to the bottom of the Z-axis and W-axis lift pieces 7 and 8, respectively. The pin kits 10a and 10b each have a plurality of pins 9a and 9b that correspond in number and pitch to the V-shaped grooves 3 on the light guide panel 1. However, in this embodiment, the X-axis slider 12' preferably does not actuate either of the lift pieces 5, 7. Rather, the X-axis slider 12' may be affixed to the body 14, and may serve to move the table 11' in the X-axis direction through the operation of an X-axis driver 19'. The table 11' may then be configured to move the light guide panel 1 in the Y-axis direction, as determined by the Y-axis controller 20'. Thus, the light guide panel 1 may be moved in the X-axis direction and the Y-axis direction to form the perpendicular arrays of V-shaped grooves 3.

The X-axis driver 19' may drive the X-axis slider 12' along an X-axis rail 17a. A Y-axis rail 17b may be affixed to the X-axis slider 12', and may hold the table 11' in sliding fashion so that the table can move in the Y-axis direction along the Y-axis rail 17b.

Once the light guide panel 1 has been fixtured on the table 11', the V-shaped grooves 3 may be formed by first activating the Z-axis controller 5 to lower the Z-axis lift piece 7 to a bottom dead center position. The table 11' with the light guide panel 1 may then be moved by the Y-axis driver 20' along the Y-axis rail 17b. As the table 11' moves, the downward-pointing pins 9a of the pin kit 10a form a plurality of V-shaped grooves 3 in the Y-axis direction. The V-shaped grooves are spaced apart by the appropriate variable pitch.

During formation of the V-shaped grooves 3 in the Y-axis direction, the W-axis lift piece 8 is located at the top dead center position and the X-axis slider 12' does not move because the W-axis controller 6 and the X-axis driver 19' are inactive.

After a plurality of V-shaped grooves 3 are formed in Y-axis direction on the light guide panel 1, the Y-axis driver 20' and the Z-axis controller 5 may operate in reverse to return the table 11' and the Z-axis lift piece 7 to their initial positions. The W-axis controller 6 may then activate to lower the W-axis lift piece 8 to the bottom dead center position, and the X-axis slider 12' maybe driven along the X-axis guide rail 17a in the X-axis direction to form a plurality of V-shaped grooves 3 on the light guide panel 1, in the X-axis direction.

As with previous embodiments, the V-shaped grooves 3 in the X-axis direction and in the Y-axis direction are formed on the light guide panel 1 through one reciprocal motion of the table 11' and one reciprocal motion of the X-axis slider 12'.

The method described above includes moving the table 11' first to form the V-shaped grooves 3 in the Y-axis direction, and then moving the X-axis slider 12' to form the V-shaped grooves 3 in the X-axis direction. However, the order of formation of the V-shaped grooves 3 may be reversed. For example, the X-axis slider 12' may first be moved in the X-axis direction to form V-shaped grooves 3 in the X-axis direction, and then the table 11' may be actuated to form the V-shaped grooves 3 in the Y-axis direction. Thus, the operational sequence of the X-axis slider 12' and the table 11' is not limited by the invention.

Figure 9:
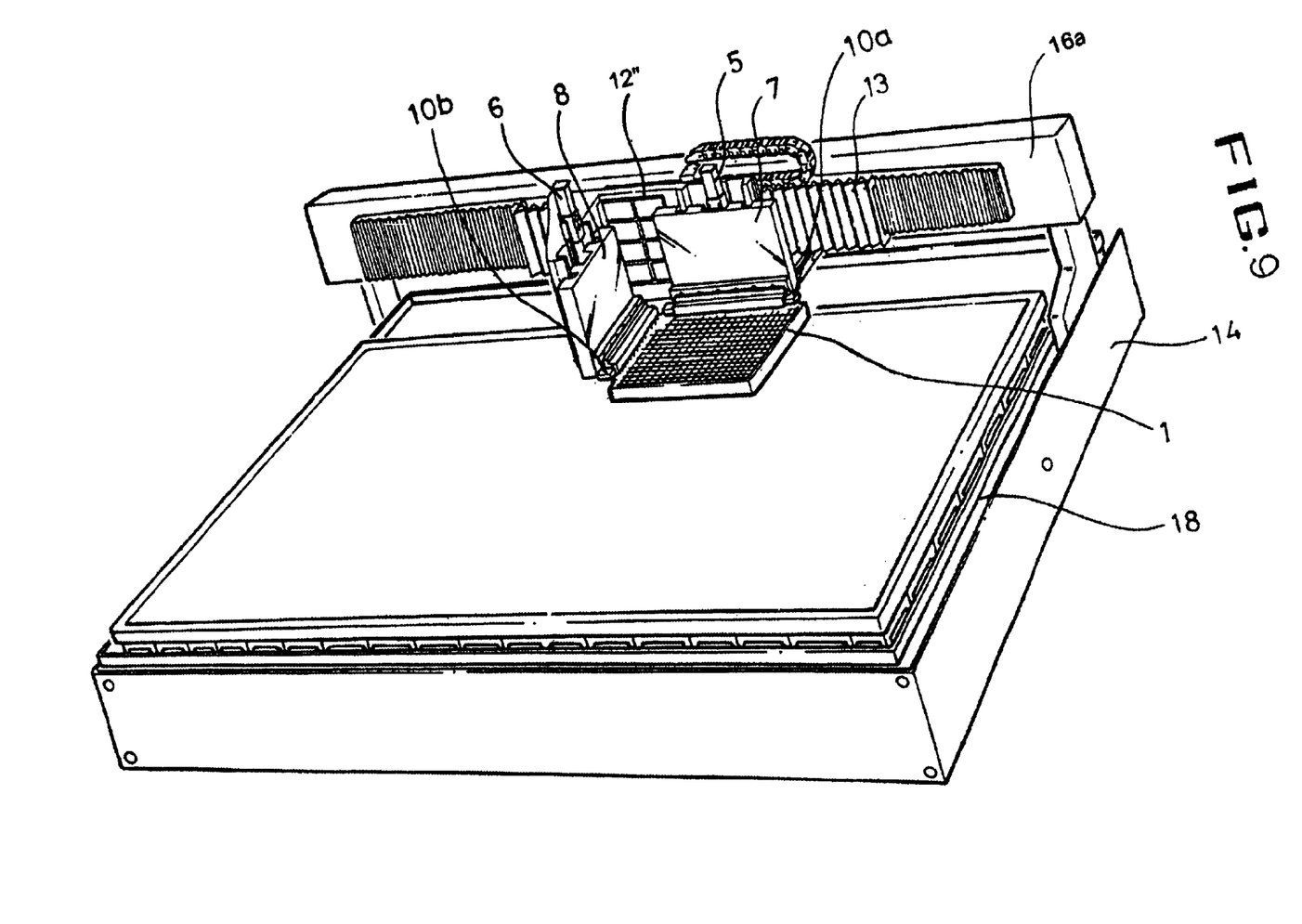
FIG. 9 is a perspective view of a fourth embodiment of a V-cutter according to the present invention.

FIG. 9 shows a fourth exemplary embodiment of the invention. In this embodiment, the body 14 may have a moving frame 16a configured to move horizontally along a guide rail 18 in a Y-axis direction. On the moving frame 16a, an X-axis slider 12" is attached to move along the moving frame 16a in an X-axis direction.

A Z-axis controller 5 may be attached to the X-axis slider 12" and connected to vertically move a Z-axis lift piece 7. Perpendicular to the X-axis slider 12", a W-axis lift piece 8 may be positioned. A W-axis controller 6 may also be provided to vertically move the W-axis lift piece 8.

As with previous embodiments, pin kits 10a and 10b may be affixed to the bottom of the Z-axis and W-axis lift pieces 7 and 8, respectively. The pin kits 10a and 10b each have a plurality of pins 9a and 9b that correspond in number and pitch to the V-shaped grooves 3 on the light guide panel 1. A table 11" for fixturing the light guide panel 1 may simply be rigidly attached to the body 14 beneath the pin kits 10a, 10b.

This embodiment differs from those of FIGS. 4, 5, 7, and 8 in that the table 11" is not moved while Z-axis and W-axis lift pieces 7, 8 move in X-axis and Y-axis directions with respect to the table 11".

After the light guide panel 1 has been fixtured to the table 11", the Z-axis lift piece 7 may be lowered by the Z-axis controller 5 and the moving frame 16*a* may be driven in the Y-axis direction along the guide rail 18, so that the downward-facing pins 9*a* of the pin kit 10*a* form a plurality of V-shaped grooves 3 in the light guide panel 1 in the Y-axis direction. The V-shaped grooves 3 are spaced apart by the appropriate predetermined pitch.

After a plurality of V-shaped grooves 3 are formed in the Y-axis direction, the moving frame 16*a* may return to its initial position and the Z-axis lift piece 7 may be similarly returned to the top dead center position by reverse operation of the Z-axis controller 5.

While the V-shaped grooves 3 in the Y-axis direction are formed, the W-axis controller 6 is preferably inactive so that the W-axis lift piece 8 is at the top dead center position.

As described above, motion of the moving frame 16*a* over the light guide panel 1, with the Z-axis lift piece 7 at the bottom dead center position, creates V-shaped grooves 3 in the Y-axis direction. After the V-shaped grooves 3 are formed in the Y-axis direction, the W-axis lift piece 8 may be lowered to a bottom dead center position through operation of the W-axis controller 6. The X-axis slider 12" may then be moved in the X-axis direction to form a plurality of V-shaped grooves 3 on the light guide panel 1 in the X-axis direction.

Figure 10:
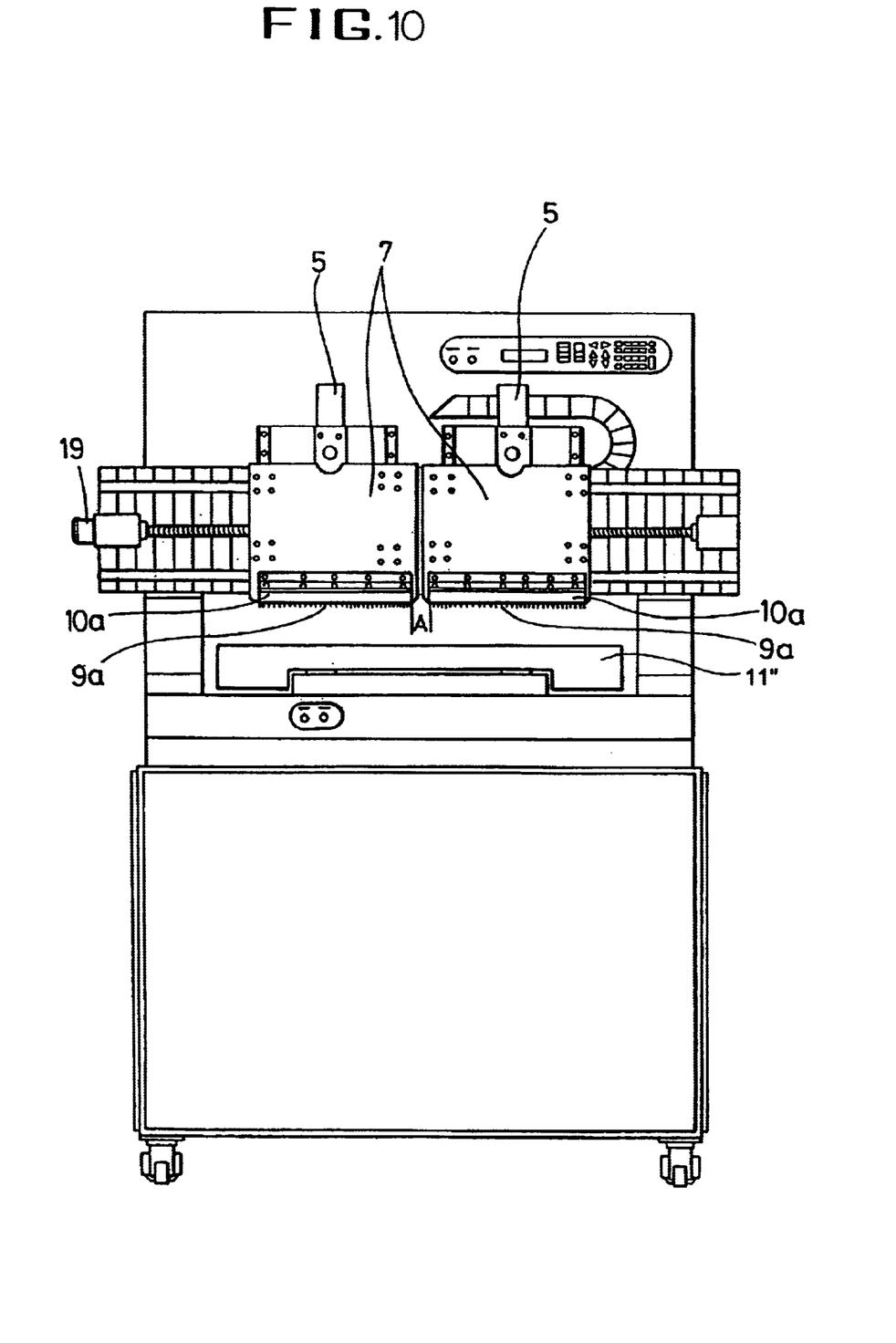
FIG. 10 is a front view of a V-cutter according to the present invention, incorporating two pin kits, each of which comprises a plurality of pins.

FIG. 10 is a front view of an X-axis slider 12" incorporating two pin kits arrayed along the X-axis direction. Two pin kits could similarly be positioned side-by-side in the Y-axis direction. Multiple pin kits may be arrayed along any axis, in any of the exemplary embodiments shown in FIGS. 4 through 9.

FIG. 10 is a front view of an X-axis slider 12 incorporating two pin kits arrayed along the X-axis direction. Two pin kits could similarly be positioned side-by-side in the Y-axis direction. Multiple pin kits may be arrayed along any axis, in any of the exemplary embodiments shown in FIGS. 4 through 9.

Such a multiple pin kit configuration is especially useful for forming the V-shaped grooves 3 in an especially wide or long light guide panel 1. For such a light guide panel 1, a single pin kit may be unable to hold a number of pins equal to the number of V-shaped grooves 3 to be formed on the light guide panel 1.

If multiple pin kits were not used for a large light guide panel 1, the single pin kit 10*a* to be used would have to be quite large in order to have the number of pins 9*a* necessary to coincide with the number of desired V-shaped grooves 3. The control motor for actuating the table 11 would also have to be somewhat bulky in order to generate the force necessary to move the heavier light guide panel 1, and the diameter of the worm gear or screw that conveys the table 11 would have to be enlarged accordingly.

Furthermore, the enlarged pin kit 10*a* would have to have a long buffer plate supporting the pins 9*a*. It would be somewhat difficult to maintain the evenness and linearity of the buffer plate over such an increased distance. Thus, the tips of the pins 9*a* would be somewhat uneven, and the resulting V-shaped grooves 3 would not have a uniform depth. Consequently, a configuration with multiple pin kits is desirable.

The configuration of FIG. 10 may operate in the following manner. The left Z-axis controller 5 may first be activated to lower the left Z-axis lift piece 7 to the bottom dead center position. The table 11" may then be actuated in the Y-axis direction to form a series of the V-shaped grooves 3 on the light guide panel 1. The left Z-axis lift piece 7 may then be lifted, and the X-axis slider 12" may be indexed to the left by the distance designated "A" in FIG. 10. The right Z-axis controller 5 may then be activated to lower the right Z-axis lift piece 7 to the bottom dead center position. Preferably, the left and right Z-axis controllers 5 cooperate to ensure that the pins 9*a* of the left and right Z-axis lift pieces 7 are lowered to the appropriate bottom dead center positions to ensure that V-shaped grooves 3 with a uniform depth are formed on the light guide panel. Thus, for unusually large light guide panels, multiple reciprocal movements of the X-axis slider 12" or the table 11" may be necessary.

However, for typical light guide panels 11", multiple reciprocal motions will not be necessary. Pin kits 10*a*, 10*b* with a number of pins 9*a*, 9*b* equal to the number of V-shaped grooves 3 to be formed may be used. The pins 9*a*, 9*b* may be positioned at varying intervals that correspond to the pitch variations of the V-shaped grooves 3. The pin kits 10*a*, 10*b* are preferably attached to the bottom of the Z-axis and W-axis lift pieces so that the V-shaped grooves 3 can be fabricated with only one reciprocal motion of the table 11" or X-axis slider 12". Thus, the manufacturing cost of the light guide panels 1 is reduced.

For example, if it is desired to form a light guide panel 1 with 250 V-shaped grooves 3 in each of the lateral and longitudinal directions, prior art devices may have to index the table 11" pitch-by-pitch and reciprocate the X-axis slider 12 250 times. However, through the advances of the present invention, the V-shaped grooves 3 are formed with one reciprocating motion of the table 11" and one reciprocating motion of the X-axis slider 12". As a result, productivity of the V-cutter can be improved by a factor of 250.

However, for typical light guide panels 11, multiple reciprocal motions will not be necessary. Pin kits 10*a*, 10*b* with a number of pins 9*a*, 9*b* equal to the number of V-shaped grooves 3 to be formed may be used. The pins 9*a*, 9*b* may be positioned at varying intervals that correspond to the pitch variations of the V-shaped grooves 3. The pin kits 10*a*, 10*b* are preferably attached to the bottom of the Z-axis and W-axis lift pieces so that the V-shaped grooves 3 can be fabricated with only one reciprocal motion of the table 11 or X-axis slider 12. Thus, the manufacturing cost of the light guide panels 1 is reduced.

For example, if it is desired to form a light guide panel 1 with 250 V-shaped grooves 3 in each of the lateral and longitudinal directions, prior art devices may have to index the table 11 pitch-by-pitch and reciprocate the X-axis slider 12 250 times. However, through the advances of the present invention, the V-shaped grooves 3 are formed with one reciprocating motion of the table 11 and one reciprocating motion of the X-axis slider 12. As a result, productivity of the V-cutter can be improved by a factor of 250.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A V-cutter for forming a plurality of V-shaped grooves on a light guide panel for a liquid crystal display, the V-cutter comprising:

a table configured to mount the light guide panel thereon;

an X-axis slider disposed above the table and configured to move horizontally in an X-axis direction;

a Z-axis lift piece disposed on the X-axis slider and having a Z-axis pin kit attached thereto which comprises a plurality of pins corresponding to a first set of the V-shaped grooves having a pitch and number to form a plurality of the V-shaped grooves in a Y-axis direction;

a Z-axis controller for vertically actuating the Z-axis lift piece;

a W-axis lift piece disposed in a direction perpendicular to the X-axis slider and having a W-axis pin kit attached thereto which comprises a plurality of pins corresponding to a second set of V-shaped grooves having a pitch and number; and a W-axis controller for vertically actuating the W-axis lift piece.

2. The V-cutter of claim 1, wherein the table is configured to move in the Y-axis direction, and reciprocating motions of either or both of the table and X-axis slider, in combination with reciprocating lifting motions of the Z-axis lift piece and the W-axis lift piece, are sufficient to form the V-shaped grooves on the light guide panel.

3. A V-cutter for forming a plurality of V-shaped grooves on a light guide panel for a liquid crystal display, the V-cutter comprising:

an X-axis slider configured to move horizontally in an X-axis direction;

a Z-axis lift piece disposed on the X-axis slider, the Z-axis lift piece having a Z-axis pin kit attached thereto, the Z-axis pin kit comprising a plurality of pins, the pins corresponding in pitch and number to a first set of the V-shaped grooves;

a Z-axis controller for vertically actuating the Z-axis lift piece;

a W-axis lift piece having a W-axis pin kit attached thereto, the W-axis pin kit comprising a plurality of pins, the pins corresponding in pitch and number to a second set of the V-shaped grooves;

a W-axis controller for vertically actuating the W-axis lift piece; and a table configured to receive the light guide panel, the table being configured to move the light guide panel horizontally in a Y-axis direction perpendicular to the X-axis direction.

* * * * *

UNITED STATES PATENT AND TRADEMARK OFFICE
CERTIFICATE OF CORRECTION

PATENT NO.    : 6,619,175 B2
DATED         : September 16, 2003
INVENTOR(S)   : Young Ho Yoo It is certified that error appears in the above-identified patent and that said Letters Patent is hereby corrected as shown below:

Column 6,
Line 22, please delete "maybe" and replace with -- may be --.

Column 7,
Line 31, please delete the paragraph
Lines 48 and 52, please delete "11" and replace with -- 11 --

Column 8,
Line 32, please delete the 2 paragraphs

Signed and Sealed this

Seventh Day of December, 2004

JON W. DUDAS
*Director of the United States Patent and Trademark Office*